United States Patent [19]

Brown

[11] 4,080,271
[45] Mar. 21, 1978

[54] SOLAR POWERED GAS GENERATION

[76] Inventor: Howard D. Brown, 96 Mark St., Bristol, Conn. 06010

[21] Appl. No.: 803,863

[22] Filed: Jun. 6, 1977

[51] Int. Cl.² ............................ C25B 1/04; C25B 1/16; C25B 1/26

[52] U.S. Cl. ...................................... 204/98; 204/128; 204/129

[58] Field of Search .......................... 204/129, 98, 128

[56] References Cited

U.S. PATENT DOCUMENTS

| 3,616,334 | 10/1977 | Aker et al. | 204/129 |
| 4,010,080 | 3/1977 | Tsay et al. | 203/10 |
| 4,011,148 | 3/1977 | Goudal | 204/129 |
| 4,011,149 | 3/1977 | Nozik | 204/129 |
| 4,021,323 | 5/1977 | Kilby et al. | 204/129 |

Primary Examiner—R. L. Andrews

[57] ABSTRACT

This invention relates to the utilization of solar energy by means of a reflector, a boiler and a turbogenerator whereby solar heat is concentrated and electric power is produced, utilization of the exhaust heat from the power cycle in the distillation of sea water, and utilization of the electric power in a plurality of electrolytic cells whereby hydrogen and oxygen are extracted from the distilled water and hydrogen and chlorine are extracted from the sea water.

4 Claims, 1 Drawing Figure

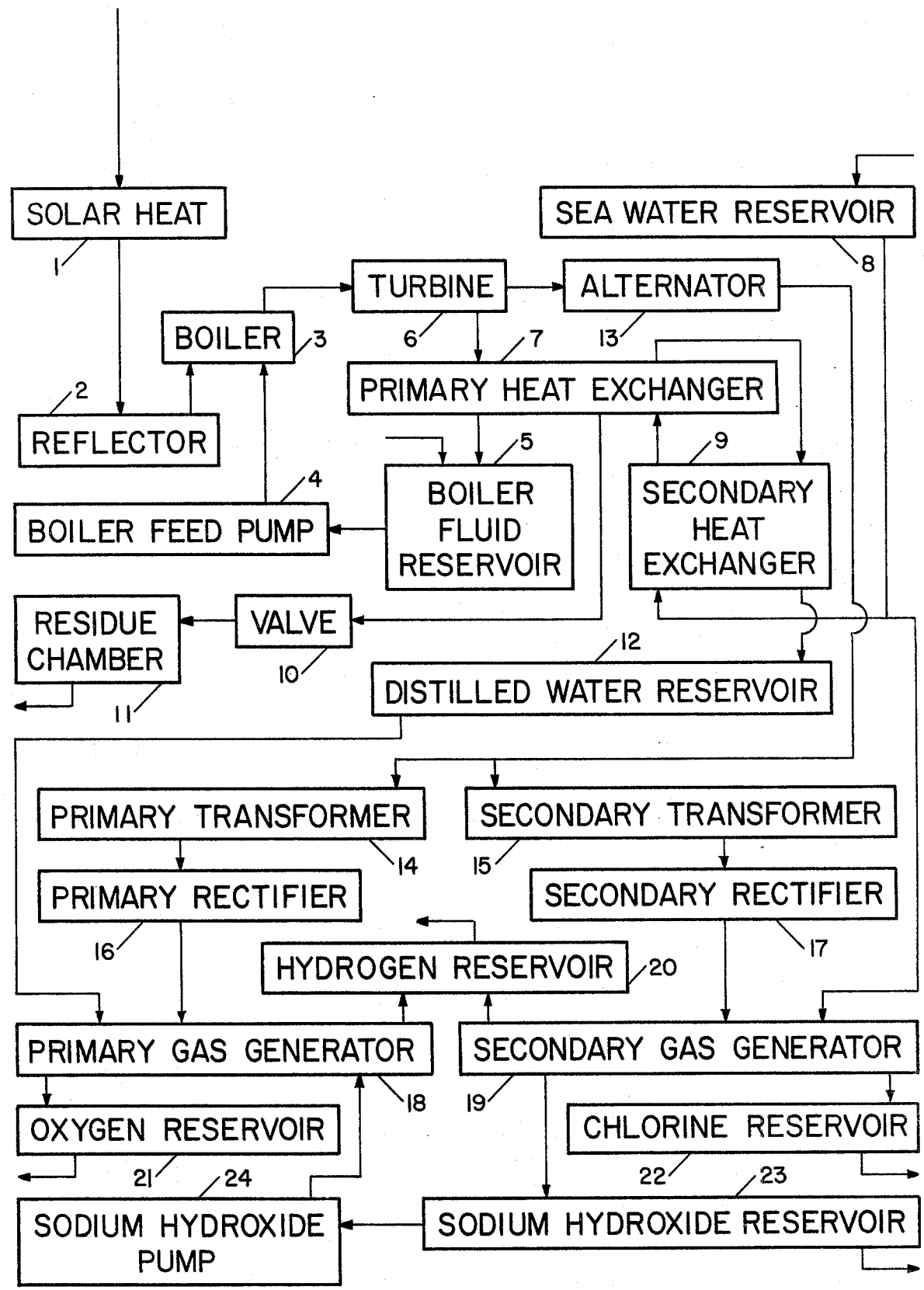

SOLAR POWERED GAS GENERATION

CROSS REFERENCE TO RELATED APPLICATION

This application relates to my co-pending patent application covering an improvement in a Solar Energy Concentrator.

BACKGROUND OF THE INVENTION

Aside from the elements of the earth itself, the two most plenteous endowments of this planet are sunshine and the waters of the sea. These limitless resources, hitherto largely neglected, can be jointly utilized, one as input energy and the other as input raw material, in order to produce, by a process of refinement and extraction, three elements of universal utility to mankind, namely, hydrogen, oxygen and chlorine.

A distinction should be made at the outset between water, usually taken to be fresh or potable, and sea water. In those areas of the earth where sunshine is most plentiful, water is nearly totally absent, but many of those areas of intense insolation are reasonably close to the sea. Thus if sea water be taken as the raw material and if solar energy be utilized both to refine said sea water by distillation and to produce electricity whereby both distilled water and raw sea water may be electrolyzed, all three of the gaseous elements can be extracted.

In the prior art, electrolysis of water is well known, as is the utilization of solar energy in this process. Solar heat was successfully utilized in the distillation of sea water, in order to produce potable water, during a period of nearly 40 years, starting over one hundred years ago, and this process is continued today in many hot, arid parts of the world. Yet, to the best of my knowledge and belief, no-one has hitherto combined this energy, this raw material and these arts into one process.

SUMMARY OF THE INVENTION

The general object of my invention is to utilize solar energy to extract gaseous elements from sea water.

A more specific object of my invention is to collect heat from the rays of the sun, to utilize this heat in the generation of electric power, to distill sea water during said heat/power cycle, and to utilize a portion of said electric power in the electrolytic separation of the thus distilled water into its elements, namely, hydrogen and oxygen.

Another specific object of my invention is to utilize a further portion of said electric power electrolytically to separate from sea water two of its elements, namely, hydrogen and chlorine.

Other objects of my invention will become apparent from the following, detailed description thereof and from the accompanying drawing.

BRIEF DESCRIPTION OF THE DRAWING

The accompanying drawing is a schematic representation of the combination of means whereby the objects of my invention may be achieved. In this drawing no attempt is made to show structural details of the apparatus, as all of the mechanical, electrical and electrochemical components, with the exception of the reflector and boiler, which are covered in a co-pending patent application, are available in various forms, and it is believed that both their physical embodiments and their usual arrangements are well known to those skilled in the pertinent arts.

DESCRIPTION OF THE PREFERRED EMBODIMENT

For a fuller understanding of the nature and objects of my invention, reference may be made to the following, detailed description taken in connection with the accompanying drawing, in which the representation of each functional component is both labeled and numbered. With reference to the details of the drawing, it is stressed that the particulars shown are for explanatory and illustrative purposes only, with the intent of providing what is believed to be a readily understood description of the principles and sequences of steps whereby the objects of the invention may be fulfilled.

Referring to the drawing, solar heat 1 is the energy input, and a reflector 2 concentrates said solar heat upon a boiler 3. A boiler feed pump 4 supplies fluid from a boiler fluid reservoir 5 to said boiler, wherein said fluid is heated to a high temperature which causes it to vaporize, The expanded vapor, at a high pressure, enters a turbine 6, causing the turbine blades and shaft to rotate, and exits from the turbine to a primary heat exchanger 7, wherein it is cooled and condensed, being returned thence to reservoir 5. The said boiler fluid will preferably be mercury or some other element or compound having a heat of vaporization higher than that of sea water.

Sea water, the incoming raw material, is piped from an external source into a sea water reservoir 8 and is fed thence at ambient temperature into a secondary heat exchanger 9, wherein it is heated and whence it is fed to the aforementioned primary heat exchanger, wherein it is further heated to a high temperature which causes it to evaporate, leaving in the primary heat exchanger a residue comprising an aqueous solution of sodium chloride, which is periodically drained from said primary heat exchanger through a valve 10 to a residue chamber 11. Water vapor from the primary heat exchanger is returned to the said secondary heat exchanger, wherein it is cooled and condensed as distilled water, flowing thence to a distilled water reservoir 12.

An alternator 13, mechanically driven by the aforementioned turbine, generates an electrical potential in the form of an alternating electric current at a suitable output voltage. The said electric current is conducted in parallel circuits to a primary transformer 14 and to a secondary transformer 15, in each of which the voltage is stepped down to a lower magnitude suitable for utilization as hereinafter described. The alternating currents leaving said transformers are conducted in separate circuits respectively to a primary rectifier 16 and to a secondary rectifier 17, wherein they are rectified to direct currents, which are conducted thence in separate circuits respectively to a primary gas generator 18, comprising a plurality of electrolytic cells, and to a secondary gas generator 19, comprising a further plurality of electrolytic cells.

Distilled water from reservoir 12 is electrolyzed in the primary gas generator, thus producing hydrogen and oxygen, which are separately and respectively piped to a hydrogen reservoir 20 and to an oxygen reservoir 21.

Sea water from reservoir 8 is electrolyzed in the secondary gas generator, thus producing chlorine, a further quantity of hydrogen, and a solution of sodium hydroxide in water, which are separately and respectively piped to a chlorine reservoir 22, to hydrogen reservoir 20 and to a sodium hydroxide reservoir 23.

A small quantity of sodium hydroxide, pumped from reservoir 23 by a sodium hydroxide pump 24, may be added as an electrolyte to the distilled water in primary gas generator 18.

Boiler fluid reservoir 5 and sea water reservoir 8 are each provided with inlet pipes, indicated in the drawing by an entrance arrow to each, whereby the contents of each reservoir may be replenished.

Residue chamber 11 and the aforesaid hydrogen, oxygen, chlorine and sodium hydroxide reservoirs are each provided with valve means and piping, indicated in the drawing by an exit arrow from each, whereby the product stored in each may be drawn off.

In the foregoing description the turbine and alternator were treated as separate units because this treatment facilitated the orderly explanation of the function of each in relation to the various preceding and succeeding functions. It is the applicant's understanding that either of the terms, "turbogenerator" or "turboalternator", is commonly accepted as being descriptive and definitive of the combination of a turbine and an alternator when these two units are permanently joined by mechanical means, "turbogenerator" being the more general and more widely used term, and "turboalternator" being the more accurate in this context. These terms are herein used interchangeably with the terms for the individual units. While a direct current generator and some other type of heat engine may be utilized instead of alternator 13 and turbine 6, respectively, the turbine and alternator are the preferred embodiments of these means for reasons of efficiency and flexibility of operation.

Also, in the foregoing description two transformers, two rectifiers and two gas generators are mentioned. The quantity of two gas generators is stated because this is the minimum needed to distinguish between two units which differ in both function and structure. However, this description is not intended to limit the process to utilization of one of each type of gas generator. The electrical characteristics of each combination of transformer and rectifier will conform to the respective input requirements of each gas generator; hence a minimum of two transformers and two rectifiers is required.

Lastly the foregoing description included the addition of a small quantity of sodium hydroxide to the distilled water in the primary gas generator. The purpose of this is to increase the rate of electrolysis of the distilled water. While an electrolyte other than sodium hydroxide can be utilized, with substantially the same result, sodium hydroxide, being a by-product of the overall process, is the preferred embodiment of said electrolyte. Since the electrolyte merely increases the rate of the process and does not affect the outcome of the process, the electrolyte may be omitted within the intent of this specification.

I claim as my invention:

1. A solar powered gas generation process which comprises the steps of concentrating solar heat upon a boiler by means of a reflector, heating a fluid in said boiler, producing vapor at a high pressure by means of said application of heat to said fluid, driving a turbogenerator by means of said vapor and thus generating an electrical potential, evaporating sea water by means of a primary heat exchanger into which said vaporized boiler fluid passes from said turbogenerator, condensing the thus produced water vapor by means of a secondary heat exchanger into which said sea water passes at ambient temperature, distilling said sea water by means of said evaporation and condensation, electrolyzing the thus distilled water by means of a gas generator which is activated by said electrical potential, producing hydrogen and oxygen by means of said electrolysis of said distilled water, and recovering separately in a plurality of suitable containers the thus produced hydrogen and oxygen.

2. A process as described in claim 1 wherein said boiler fluid is a volatile fluid which has a heat of vaporization higher than that of sea water.

3. A process as in claim 1 which comprises the additional steps of electrolyzing a separate quantity of said sea water by means 13 a second gas generator which is also activated by said electrical potential, producing hydrogen, chlorine and an aqueous solution of sodium hydroxide by means of said electrolysis of said sea water, and recovering separately in a plurality of suitable containers the thus produced hydrogen, chlorine and sodium hydroxide.

4. A process as in claim 1 which comprises the further step of adding a small quantity of electrolyte to said distilled water in said gas generator.

* * * * *

UNITED STATES PATENT OFFICE
CERTIFICATE OF CORRECTION

Patent No. 4,080,271                    Dated   March 21, 1978

Inventor(s) Howard D. Brown

It is certified that error appears in the above-identified patent and that said Letters Patent are hereby corrected as shown below:

Column 2, line 28, "higher," should read --- lower. ---.

Column 4, line 33, "higher," should read --- lower. ---.

Column 4, line 36, "13" should read --- of ---.

Signed and Sealed this

*Twenty-fourth* Day of *October 1978*

[SEAL]

*Attest:*

RUTH C. MASON
*Attesting Officer*

DONALD W. BANNER
*Commissioner of Patents and Trademarks*